Figure 1:
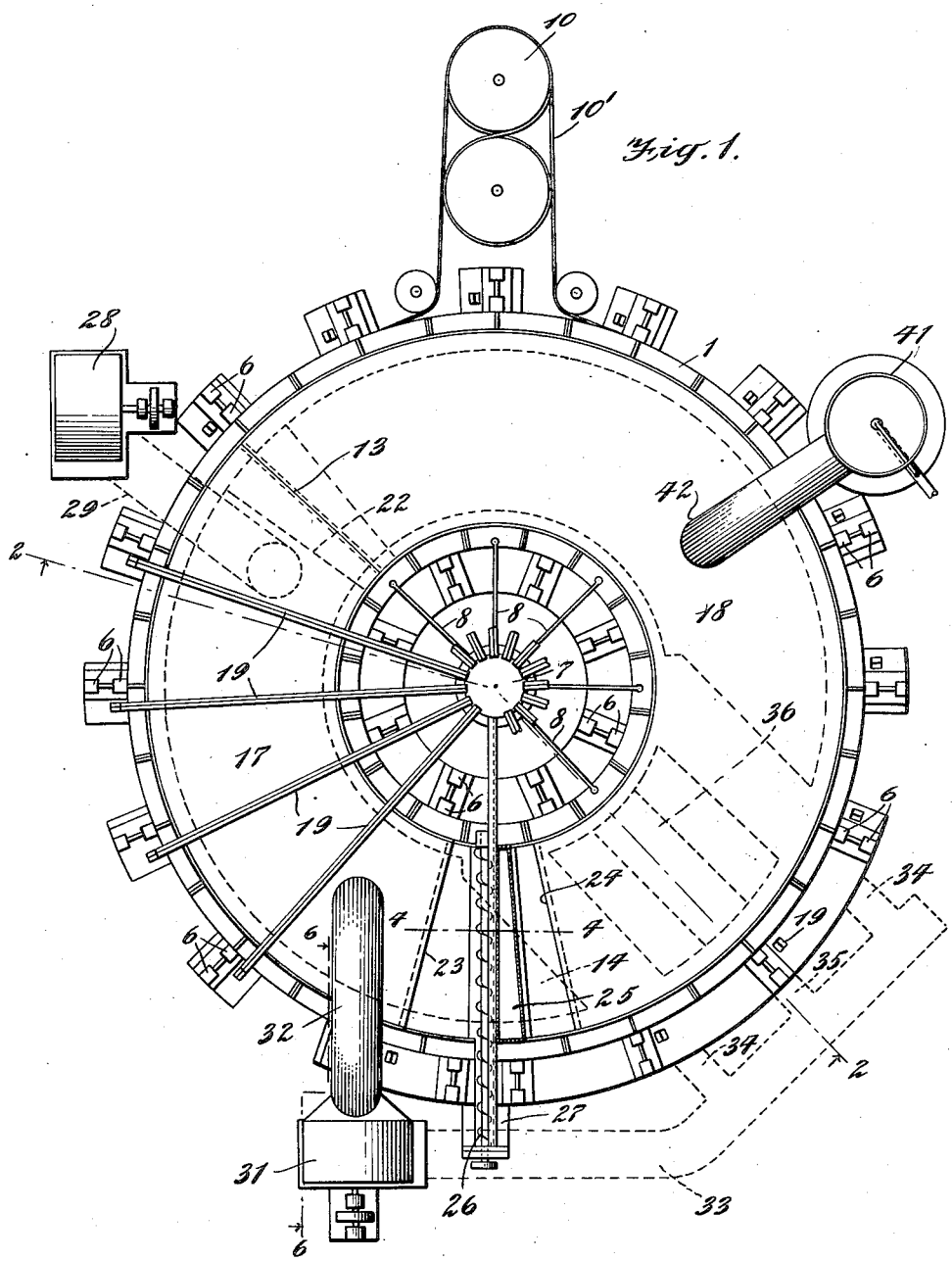

N. C. CHRISTENSEN, Jr.
METHOD OF TREATING ORES AND THE LIKE.
APPLICATION FILED MAR. 26, 1913.

1,075,011.

Patented Oct. 7, 1913.

3 SHEETS—SHEET 1.

N. C. CHRISTENSEN, Jr.
METHOD OF TREATING ORES AND THE LIKE.
APPLICATION FILED MAR. 26, 1913.
1,075,011.
Patented Oct. 7, 1913.
3 SHEETS—SHEET 2.
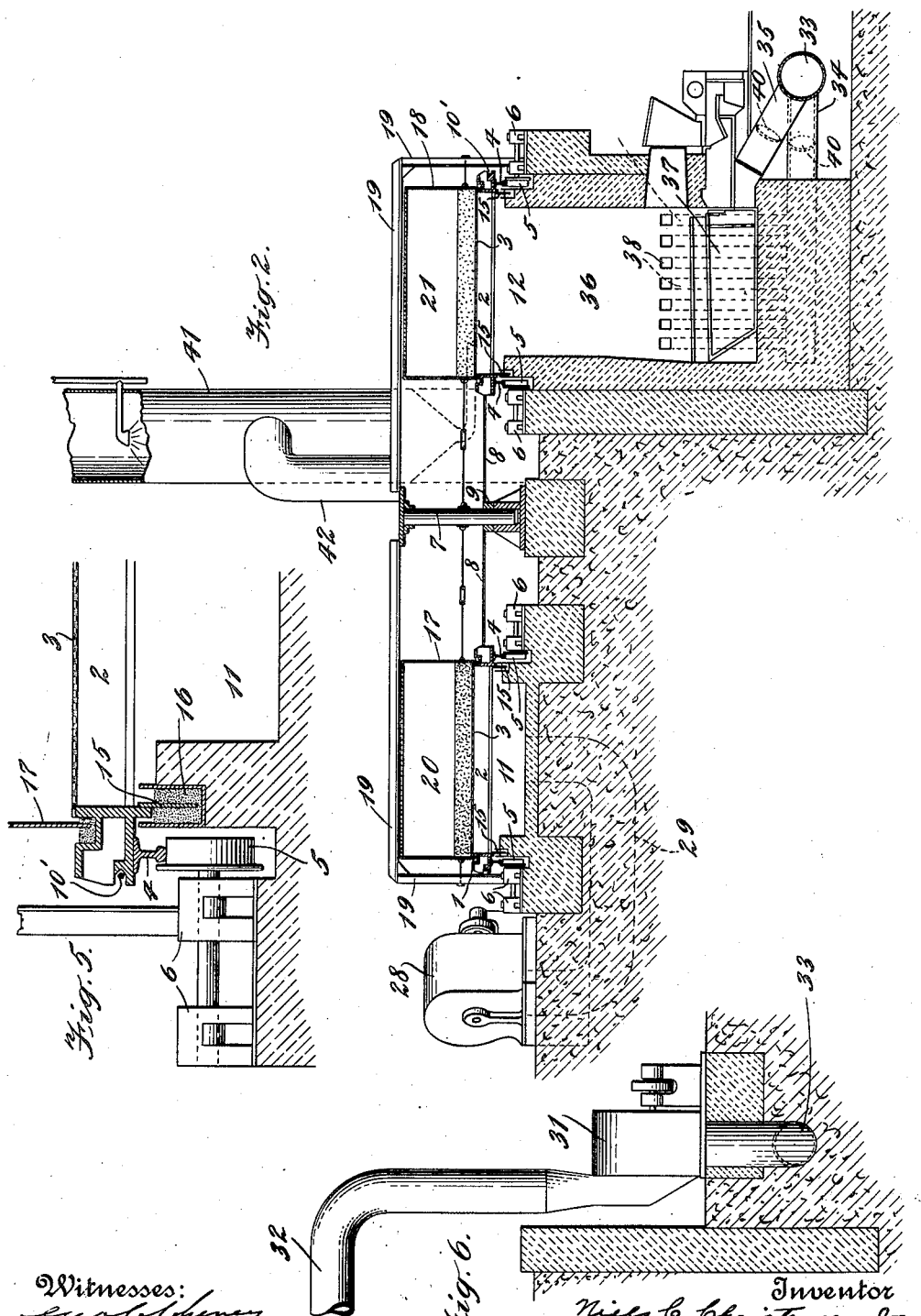

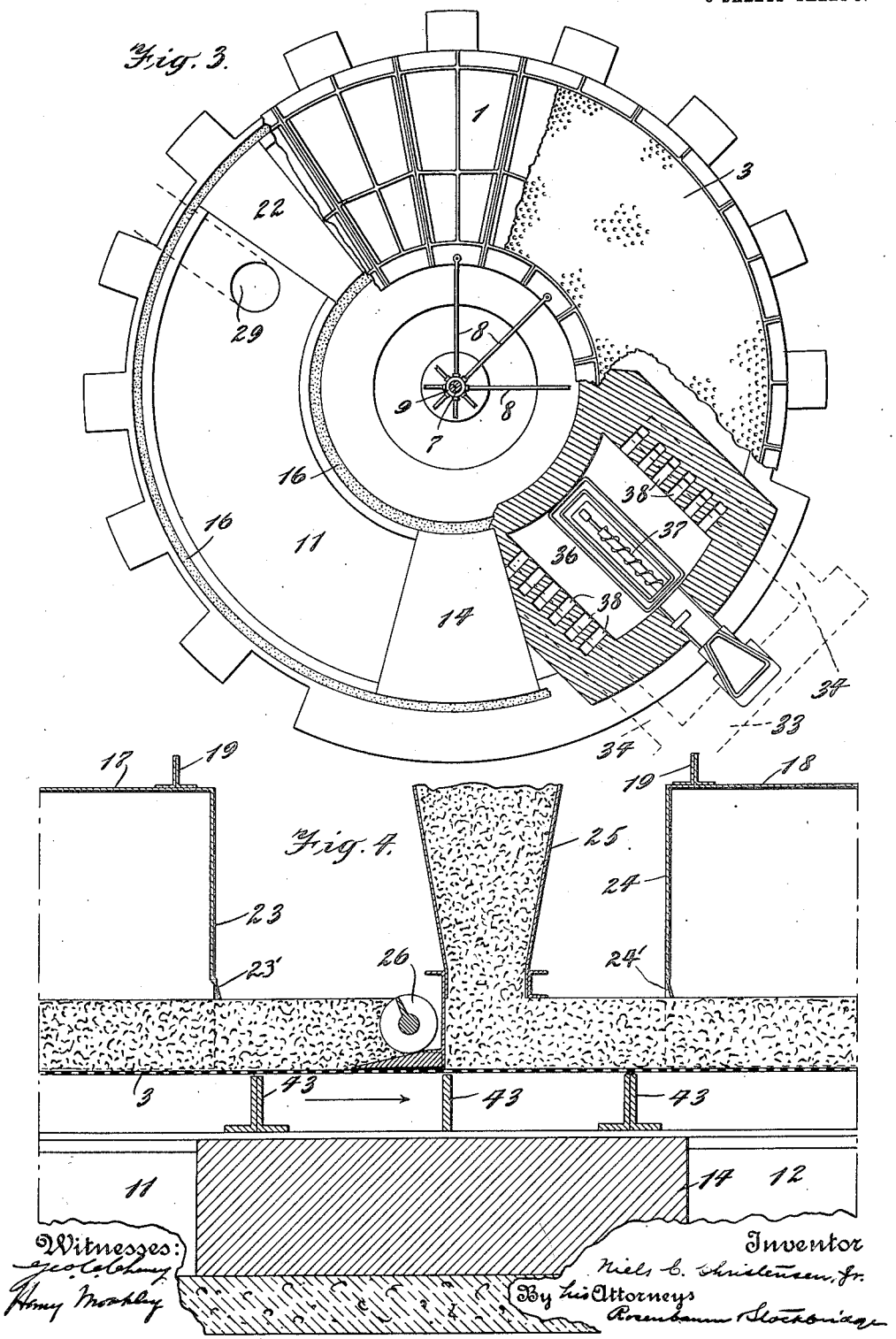

though I have shown this special form of apparatus for carrying out

UNITED STATES PATENT OFFICE.

NIELS C. CHRISTENSEN, JR., OF SALT LAKE CITY, UTAH.

METHOD OF TREATING ORES AND THE LIKE.

1,075,011.  Specification of Letters Patent.  Patented Oct. 7, 1913.

Application filed March 26, 1913. Serial No. 757,002.

*To all whom it may concern:*

Be it known that I, NIELS C. CHRISTENSEN, Jr., a citizen of the United States, residing at Salt Lake City, in the county of Salt Lake and State of Utah, have invented certain new and useful Improvements in Methods of Treating Ores and the like, of which the following is a full, clear, and exact description.

This invention relates to a novel method of treating ores, or mixtures of minerals, to extract, or prepare for the subsequent extraction, of metals or other elements therefrom, and in its broadest aspects is applicable to either oxidizing, reducing, chloridizing or sulfatizing processes or to combinations of these; and to the volatilizing or vaporizing and collection of elements or compounds mixed with such materials or formed by reactions in the mass of material undergoing treatment, and to the leaching and recovery of the valuable metals or compounds therefrom.

The method is more particularly intended for use in the treatment of low grade ores containing gold, silver, copper, lead, nickel or zinc, but is economically applicable in many cases to other ores; so that I do not desire to be limited to any particular metal or metals, element or elements, nor to the grade of the ores or material treated.

The invention contemplates the heating and cooling of ore and the like in such a manner that the duration and temperature of treatment may be controlled with relative accuracy, and the character of the atmosphere or gaseous medium with which the said substance or substances are in contact, during each successive step or stage of the process may also be under positive control. Thus, by way of illustration, it is possible by means of the herein described method and apparatus to heat a mass of ore to be treated at substantially a given temperature and under determined atmospheric conditions and thereafter to cool said mass down to a given lower temperature in the presence of an atmosphere having a similar or different character, as desired, to that to which the mass was first subjected, the temperature and duration of treatment being at the same time under positive control of the operator. By this accurate control of the factors of treatment the method aims to secure a high efficiency in causing the chemical reactions desired in this part of the process.

My method also aims at securing a very high heat efficiency with substantially a minimum consumption of fuel, by conserving much of the heat energy heretofore lost or wasted in the ores and gases discharged from roasters and similar ore treating apparatus.

My invention further contemplates the treatment of the ore, or the like, with various chemical reagents adapted to react therewith to prepare it for leaching out the valuable metals contained therein with suitable solvents or reagents.

The method also aims to volatilize or vaporize certain elements or chemical compounds preparatory to collecting them for subsequent treatment and for use in leaching the ores, thereby preventing loss of chemicals and values. An especially advantageous feature of the process is that these fumes are collected comparatively free from dust.

The invention especially contemplates the conservation of the chemicals used both in roasting and leaching by preventing their escape and continually restoring them to active use in the system.

The invention also contemplates the reduction of the metals to the metallic state for concentration, with suitable apparatus, in the case of certain ores suited to such treatment.

These and the other objects of my invention, and the steps of the novel process whereby they may be attained, will hereinafter be more fully described and more specifically referred to in the claims appended to this description.

In the drawings which form a part hereof I have exemplified a type of apparatus as embodying special advantages and new features which are set forth in the following description and though I have shown this special form of apparatus for carrying out my process, I do not desire to be limited to this exact form alone, as my process may be carried out advantageously in other forms of apparatus. The advantages and special features of the apparatus will be set forth in detail in the following description. I am also aware that various changes and modifications may be made in my process without departing from the spirit of my invention, and I accordingly wish to be limited only by the scope of the appended claims.

The special apparatus, or furnace, and auxiliary apparatus used in the process are shown in the accompanying drawings.

Figure 1 is a plan of the furnace and auxiliary apparatus; Fig. 2 is a section of Fig. 1 on the line 2—2; Fig. 3 is a plan similar to Fig. 1 with portions of the device removed; Fig. 4 is an enlarged section on the line 4—4 of Fig. 1; Fig. 5 is an enlarged detail showing the sand seals. Fig. 6 is a section on the line 6—6 of Fig. 1.

The same numbers refer to the same parts in all the figures.

The apparatus shown is composed of an annular deck (1), which consists of a cast iron frame (2), carrying a perforated grate (3). This grate (3) may consist of woven wire, perforated sheet steel, or perforated cast iron as necessary according to the temperature and character of the gas to which it is subjected. Upon the lower side of the deck, and extending around the deck near each edge, are the rails (4) which support the deck upon the wheels (5) which are spaced at suitable intervals on the outer and inner edge of the ring. The bearings (6) support the wheels (5). The annular deck is also tied to the central pillar (7) by the rods (8), which are fastened to the collar (9) which turns on the pillar (7). The deck is rotated about the central pillar (7) upon the wheels (5) by means of the driving mechanism (10) and the rope (10') which encircles the deck. Beneath the deck is an annular sealed space divided into two portions (11 and 12) by the wide partitions (13—14). The part (11) is beneath the cooling portion or stage of the apparatus and the part (12) beneath the heating or roasting portion or stage. These spaces are sealed from the outside air by the ore above, the foundations beneath, and upon the sides the seal is completed by the two short concentric cylinders or plates (15) which are attached to the sides of the deck (1) and move in the concentric annular sand seals (16) as the deck rotates. Above the deck is the stationary annular hood (17—18), supported by the columns and beams (19). It is divided into two chambers (20 and 21) by the partition (22), the part (20) being above the cooling stage of the deck and the part (21) above the heating or roasting stage. The partition (23) closes the hood (17) and the partition (24) closes the hood (18), on opposite sides of the open spaces for charging and discharging the ore and observing the ore as it goes into and comes out of the apparatus. The partitions (22, 23 and 24) extend down almost to the top of the charge. The ore is charged onto the slowly revolving deck or hearth in a uniform layer from the hopper (25) and removed from the deck by the fixed scraper and screw conveyer (26) extending across the deck and discharging into the box (27), which feeds a belt conveyer, elevator or bin below (not shown). The screw conveyer and scraper (26) are supported by a beam attached to the central column at the inner end and rest upon the working floor at the outer end. The fan (28) is connected to the space (11) beneath the cooling stage or portion of the deck by the pipes (29). The space (20), above the cooling portion of the deck, is connected to the fan (31) by the pipe (32) (see Figs. 1 and 6). The pipe (33) connects the fan (31) with the pipes (34 and 35) which lead to the combustion or heating chamber (36). In the case shown coal is used for heating the gases, and is supplied at the proper rate by the American stoker (37). If gas or oil are used the stoker would be replaced by suitable pipes or burners supplying oil or gas. The pipe (35) leads from the main pipe (33) to the stoker and the pipes (34) through the vents (38) to the chamber (36) above the stoker. The proportion of the air or gas supplied by (31), which passes through the stoker and the vents (38), is regulated by the dampers (40). In case oil or gas is used instead of coal the stoker would be replaced by a gas or oil burner of suitable design. The chamber (36) opens into the space (12) beneath the heating or roasting part or stage of the deck. The space (21), above the roasting or heating part or stage of the deck, is connected to the condensing tower (41) by the pipe (42). The hoods and pipes may be made of sheet iron, cast iron or refractory material and may be suitably lined to withstand the temperature and gases in each case.

The mode of operation is as follows: The hopper (25) is kept supplied with ore moistened with a suitable portion of water or mill solution so as to give a light permeable mass. As the deck (1) rotates continuously at the proper speed in the direction shown, the ore is fed in a uniform layer upon the deck and passes into the heating or roasting part or stage of the furnace (12—21), and after being heated passes into the cooling part or stage of the furnace (11—20). The heating, or roasting, and cooling are brought about in the following manner: In the case of an oxidizing or chloridizing roast the cold air is forced by the fan (28), through ore in the cooling chamber, and abstracts the heat therefrom, becoming thereby heated itself. This heated air is drawn from the chamber (20) by the fan (31) and forced through the chamber (36) where part of it reacts exothermically with the fuel (coal, oil or gas), supplied by the stoker or oil or gas burners, thereby heating the entire volume of air to the desired temperature. After becoming heated in the chamber (36) the heated gases pass into the chamber (12), beneath the heating or roasting part of the deck, and up through the ore in the heating or roasting part or stage of the furnace, thereby heating the ore to the desired temperature, and oxidizing or chloridizing parts of the mass or bringing about other desired reactions. By the passage of the heated gases through the cold, moist ore they are cooled so that very little heat escapes with them from the roast except in the final stages of the roast (or heating) near the partition (22). From the space (21), above the heating or roasting stage, the gases are drawn to the condensing tower (41) where the acid fumes or volatilized vapors are collected in the solution passing down the tower (41). In order to avoid any leakage from 11 to 12, between the partition (13) and the lower part of the revolving deck (as shown in Fig. 6), the pressure of the gases in A and B must be approximately the same. This is secured by choosing fans 28 and 31 so that they deliver the gases at approximately equal pressures. Though the mass of air passing through the two fans is practically the same, the volume is larger in 31 as the air is heated in passing through the ore in the cooling area. The size or capacity of the fan is therefore proportioned so as to take care of this increase in volume. Also the volume of the gases passing through the heating or roasting stage is much greater than that passing through the cooling stage, due to being heated by passing through the cooling ore and the combustion or heating chamber (36). The area of the heating portion of the apparatus is therefore made larger than the cooling portion in proportion to this increase in the volume of the gases. This adjustment is secured by shifting the partition 14 and also the partition 22. Practically no leakage will occur in the open space due to the arrangement of the partition 14, the scraper and screw discharge (26), and the partitions 43 as shown in Fig. 4. Since the capacity of the fan 31 is proportioned to remove just the volume of gas passing through the ore in the cooling stage, practically no leakage will occur at the sides or end of the hood (17). The hood may, however, be sealed by sand seals as shown in Fig. 5. The small open spaces at the ends of the hood may also be closed by light curtains or doors (23') and (24'), resting upon the ore at the lower end. The gases from the space (21) or hood (18), above the roasting ore, are drawn to the tower (41) as they come from the ore. If the hot gases coming from the ore in the cooling chamber (20) are in excess of the amount necessary to roast the ore in the heating stages of the furnace (12 to 21), the excess of hot gases may be drawn from the chamber 20 and used to dry the ore before it is crushed or for other purposes in the mill. Or, if desired, may be discharged into the atmosphere. The necessary adjustments may be readily made by shifting the partition (13—22) so that the ratio of the cooling and heating portions of the grate or deck are in proportion to the amount of gas required in each case. The discharge from the fans may be adjusted to give the required volume for each part of the furnace. In any case, the hot gases from the cooling stage will be in excess of the amount required for roasting and may be profitably used for drying the air where fine crushing is necessary. These adjustments may be made with relative accuracy according to the condition in each case so that the apparatus acts as a closed passage for the gases from the fan 28 to the condensing tower (41).

By suitably proportioning the supply of fuel (coal, oil, gas) supplied to the chamber (36) the atmosphere in the heating or roasting part of the furnace may be made either oxidizing, reducing or approximately neutral. In case the ore contains a comparatively large per cent. of sulfids, carbonaceous, or other oxidizable material, this adjustment is decidedly advantageous, as the atmosphere may be made so slightly oxidizing that the oxidation occurs gradually as the ore passes through the heating portion of the furnace, thus avoiding the fusing which would occur if a highly oxidizing atmosphere were forced through the ore.

In case a reducing roast is desired, fuel gas is supplied to the fan 28, and air to the chamber (36), by suitable pipes in place of the stoker or burners. By suitably proportioning the supply of air and gas to the chamber (36) the atmosphere in the heating part of the furnace may be either oxidizing, reducing or approximately neutral. The practical value and importance of the reducing roast is, however, relatively insignificant when compared with the chloridizing or oxidizing roast. Instances occur, however, where it may be applied as in the case of the oxidized minerals of copper occurring in limestone, which may, in some cases, be reduced to the metallic state and concentrated.

I am of the opinion that the high efficiency of the process in oxidizing, chloridizing or reducing is due to the very intimate contact of the gases with the ores, since in most other furnaces the gases come in contact only more or less superficially with the ores. The great efficiency of the process as a whole is due, not only to this intimate contact, but also to the fact that the temperature may be controlled with relative accuracy, and the duration of treatment may be accurately controlled by the speed of revolution of the deck. The high heat efficiency secured by discharging the ore and gases in a relatively cool condition is also of considerable importance in reducing the cost of treatment. The collection of the volatilized or vaporized metallic compounds and acid fumes from chloridizing roasts is of great importance in reducing the loss of chemicals. Though the amount of gold or silver volatilized in a chloridizing roast by this method is relatively insignificant as compared with the ordinary chloridizing roast, their escape is prevented by passage of the gases through the tower (41). The great importance of collecting the acid elements and compounds generated in the roast and the excess chemicals mixed with the ore and driven off during the roast will appear in the description of the complete treatment of an ore containing gold, silver, copper and lead as given below.

The ore is mixed with the proper portion of salt and pyrite, or other sulfid, to give the chloridizing reactions, and ground to the proper fineness. The mixture is then moistened with sufficient mill solution to give a loose, permeable mass. In some cases the mixture of sulfids is unnecessary and deleterious and is therefore omitted. The mill solution will consist ordinarily of an approximately saturated solution of NaCl with sufficient HCl to act upon the Cu and Pb. If possible the solution is preferably saturated with NaCl, $MgCl_2$ and $CaCl_2$. In this case very little salt need be mixed with the ore as the solution will contain sufficient of the chlorids to give the chloridizing action. The per cent. of solution will vary from 6 to 15% according to the fineness of grinding. The ore is then continuously charged in a uniform layer upon the revolving deck from the feed hopper (25), and is roasted at the proper temperature and cooled by passing through the roasting and cooling portions of the furnace, and discharged by the screw conveyer into the box (27) which feeds a belt conveyer or other device for carrying the ore to the leaching department (not shown). The thickness of the layer of ore charged upon the deck will vary from 3 to 18 inches according to the fineness to which the ore is ground, the finer the ore the thinner the layer must be in order to secure maximum capacity, as the permeability decreases and weight of the layer decreases with the fineness, and therefore reduces the maximum pressure which may be used to force the gases through the charge without any danger of blow-holes in the layer of ore. The ore is then charged into wood lined chlorination barrels with the proper amount of mill solution and enough chlorin or bleaching powder to dissolve the gold and agitated from two to six hours. The action of the solution is, in general, as follows: The Cl dissolves the gold, the chlorids dissolve the silver chlorid formed in the roast, the acids (mainly HCl) dissolve the Cu and the acid salt solution dissolves the Pb. The solution in the barrel is also active in chloridizing some of the silver not acted upon in the roast. The rich solution is then filtered off and the ore washed with barren mill solution, and finally with water to displace the mill solution remaining in the ore, so that but little acid and chlorids are lost in the tailings. The rich solution is piped to the precipitating department where the gold and silver are precipitated upon copper in wooden boxes or filter presses. From here the solution passes to the iron tower or boxes where the copper and lead and remaining gold and silver are precipitated upon scrap iron. From the precipitating department the solution passes to the condensing tower (41) where the acid fumes, driven out of the moist ore and the acid fumes generated in the roast, are collected. From the tower, part of the solution goes to moisten the ore before charging and the remainder to the leaching department. The ferrous iron salts introduced into the solution from the copper and lead precipitating department are changed to the ferric condition in the tower. If this action is not complete, enough Cl must be added in the barrels to prevent precipitation of the gold. If possible just enough fresh water is used in the final washing to make up for the amount driven off in the roast and by evaporation, etc., and a relatively concentrated solution of NaCl, $CaCl_2$, $MgCl_2$, with the proper per cent. of HCl is used for the mill solution. Very little acid is consumed in the process, since the iron salts in the solution used to moisten the ore are decomposed in the roast and the acid elements returned to the system. As amount of solution used in moistening the ore averages about 10 to 12%, the iron salts are removed from the solution about every ten days if the amount of solution in the system is equal to the amount of ore treated per day. From the above it is apparent that the amount of solution in the system should be kept as low as possible.

The advantage of using a concentrate solution of NaCl, $CaCl_2$ as a mill solution is due to the fact that the solution used to moisten the ore will then usually carry enough, or almost enough, chlorids to give the proper chloridizing effect in the roast, and most of the undecomposed chlorids in the roasted ore will be returned to the mill solution by the wash water (which could not ordinarily be done if salt alone were used) thus materially cutting down the amount of salt lost in the process. The question of cost and availability will necessarily determine whether NaCl will be used alone or with CaCl₂ or MgCl₂ in the mill solution, and I do not wish to limit myself to the use of any one of these or any special combination of them, but preferably I use a solution containing all three. The amount of chlorids lost in the process is also comparatively small, since the undecomposed chlorids used in the roast are returned to the system by the wash water. The slight losses in acid and chlorids may be largely made up by the addition of the acid and bleaching powder necessary to cause the solution of the gold. The final losses in chlorids are made up by the mixture of sufficient salt with the ore before roasting and the loss of acid by adding acid to the solution at the barrels or tower.

The great efficiency and economy of the process and the novelty of the combination of features involved will appear from the following results which it secures:—high heat efficiency by delivering both the ore and gases from the furnace at a low temperature: high chemical efficiency by the accurate control of the temperature and duration of treatment, and also to the intimate contact of the ore with the chemical reagents and gases: great economy of fuel due to the high heat efficiency and the relatively low roasting temperatures needed on account of the high chemical efficiency of the roast: short time of treatment in both roasting and leaching due to the use of a relatively concentrated solution of mill solution giving a high chemical efficiency: large furnace capacity on account of relatively short duration of treatment necessary: small total amount of mill solution necessary due to the short time of leaching treatment which is required: high capacity of the leaching plant due to the short time of treatment: practically no loss of values by volatilization, due to the condensing and collecting of the fumes in the mill solution: no loss of values in the dust, due to the moistening of the ore and the roasting and cooling of the same without any disturbance of the bed of ore: great economy of the chemicals used, due to the prevention of their loss in roasting and leaching and their continual restoration to active use in the system. For example, the loss of HCl is prevented by condensing the fumes in the tower and by using the mill solution from the leaching and precipitating departments to moisten the ore before roasting, whereby the iron salts are decomposed and the acid element caught in the tower and restored to active use again. The loss of chlorids and acids in the tailings is reduced to a minimum by moistening the ore with a mill solution containing, approximately, enough of the common chlorids NaCl, CaCl₂ and MgCl₂ to bring about chloridization reactions in the roasting and washing these out after leaching with a final water wash, which is merely sufficient to make up the losses in the mill solution caused by evaporation in roasting: simplicity in operation, due to securing all the values in gold, silver, copper and lead in one solution: adaptability to ores of any or all of the metals, gold, silver, copper and lead; adaptability to leaching in tanks and barrels according to the character of the ore.

By this method numerous ores from various portions of the United States and Mexico have given extractions as follows: gold 85 to 95%, silver 80 to 96%, copper 70 to 98%, lead 90 to 99%.

The great economy of this method of roasting and treating the ore is apparent from the above description, and involves a new combination of features never before secured in a metallurgical process. Its successful application to ores containing all the metals, gold, silver, copper and lead at the same time is a remarkable feature never yet secured as far as known to me. Numerous tests upon different ores, both upon a small and large scale, have demonstrated the efficiency, economy and practicability of the process, and the 1st 100 ton unit of a large plant is now in course of erection at Silver City, Utah, for the treatment of the ores of that district by this method.

Modifications of the process, as above outlined, for an ore of gold-silver-copper-lead, readily adapt the process for one or more of these metals. For example:—use of the leaching part of the process, without the addition of chlorin upon ores containing little or no gold; the use of leaching vats for ores containing no gold and coarse enough for this purpose.

Some applications of the process, in part and as a whole, are as follows:—chloridizing roast of ores containing one or more of the metals gold, silver, copper, lead, and agitating and leaching with a relatively concentrated solution of one or more of the following chlorids: NaCl, CaCl₂, MgCl₂, containing HCl; using the same mill solution for moistening the ore, collecting the acid fumes and leaching the roasted ore, and in the case of ores containing gold adding some bleaching powder to the leaching solution to furnish chlorin for the solution of the gold.

The extractions secured upon relatively low grade ores from Tintic, Bingham, Park City, Cactus, Utah; Pioche, Nev. and other mining districts in Utah, Nevada, Idaho, Colorado, and from Mexico, show extractions as follows: gold 80 to 95%, silver 80 to 96%, copper 75 to 98%, lead 80 to 99%.

The roasting process is applicable to the chloridizing roast of silver-gold ores previous to cyaniding, and to the sulfatizing roast of sulfid copper ores; and to the oxidizing roast of refractory gold ores, such as those of Mercur and Cripple Creek, previous to cyaniding. Tests upon the application of this process to ores containing zinc, as well as one or more of the above metals, gives promise of great commercial possibilities. This is true also of the ores of nickel which respond readily to this method of treatment.

There are many other applications of this process to ores and the like for roasting and leaching to extract the values therefrom, and for roasting previous to the extraction of metal therefrom by suitable means so it is not the intention to be limited to the applications herein described but only by the scope of the claims appended hereto.

Having described my invention, I claim:—

1. In the method of treating metalliferous ore, the steps which consist in moistening the crushed ore with a solution containing at least one reagent adapted to react with the ore, roasting the ore, condensing the volatilized products and the acid fumes generated in the roast in another portion of the above referred to solution, and leaching the metal from the ore with said last mentioned portion of said solution.

2. In the method of treating metalliferous ore, the steps which consist in moistening the crushed ore with a solution containing at least one of the common chlorids, condensing the volatilized products and acid fumes generated in the roast in another portion of the above referred to solution and leaching the metal from the ore with the last mentioned portion of the solution.

3. In the method of treating metalliferous ore, the steps which consist in moistening the ore with a relatively concentrated solution of a reagent adapted to react with the ore, roasting the ore, condensing the volatilized products and acid fumes generated in the roast in another portion of the solution, and leaching the metal from the ore with said last mentioned portion.

4. In the method of treating metalliferous ore, the steps which consist in moistening the ore with a relatively concentrated solution containing at least one of the common chlorids, roasting the ore, condensing the volatilized products and acid fumes generated in the roast in another portion of the solution, and leaching the metal from the ore with said last mentioned portion.

5. In the method of treating metalliferous ore, the steps which consist in moistening the ore with a portion of a solution containing a reagent in an inactive state adapted to react with the ore, roasting said ore, condensing the volatilized products and acid fumes generated in the roast with another portion of said first mentioned solution, and leaching the metal from the ore with said last mentioned portion of said solution.

6. In the method of treating metalliferous ore, the steps which consist in moistening the ore with a portion of a solution containing at least one of the common chlorids in inactive state, roasting said ore, condensing the volatilized product and acid fumes generated in the roast in another portion of said first-mentioned solution, and leaching the metal from the ore with said last mentioned portion of said solution.

7. The method of treating metalliferous ore which consists in moistening the ore with a portion of relatively concentrated solution containing at least one reagent adapted to react with the ore, roasting the ore, condensing the volatilized products and acid fumes generated in the roast with another portion of the solution, leaching the metal from the ore with the last mentioned portion, washing the leached ore with sufficient water to return to the last-mentioned portion of solution the water lost during the roast, precipitating the leached metal from the last-mentioned portion and using the barren solution in the treatment of more ore.

8. The method of treating metalliferous ore which consists in moistening the ore with a portion of relatively concentrated solution containing at least one of the common chlorids, roasting the ore, condensing the volatilized products and acid fumes generated in the roast with another portion of the solution, leaching the metal from the ore with the last-mentioned portion, washing the leached ore with sufficient water to return to the last-mentioned portion of solution the water lost during the roast, precipitating the leached metal from the last-mentioned portion and using the barren solution in the treatment of more ore.

9. The method of treating metalliferous ore which comprises moistening the ore with a solution containing at least one reagent adapted to react with the ore, establishing a flow of a mass of ore so treated in stages, subjecting said ore while in one stage and when heated to contact with gaseous matter and imparting heat to said matter from the ore, and thereafter subjecting another quantity of the said ore while in a stage prior to the above referred to, to contact with the so heated gaseous matter, collecting the volatilized products and acid fumes from the cooled gaseous medium by condensing with a portion of the solution above referred to, leaching the metal from said ore with said portion of the solution, and precipitating the metal from said portion and using the same for the treatment of more ore.

10. The process of treating metalliferous ore which comprises moistening the ore with a solution containing at least one reagent adapted to react with the ore, and successively subjecting the ore so treated to heating and cooling actions by heating a quantity of said ore through contact with a hot gaseous medium and cooling a so previously heated quantity of said ore by bringing it into contact with a relatively cool gaseous medium thereby partly heating the last-mentioned gaseous medium and converting said now partly heated gaseous medium into the hot gaseous medium aforesaid by reacting upon portions thereof with a reagent adapted to react exothermically therewith, collecting the metallic products and fumes from said hot gaseous medium after contact with the ore by condensing the same with a portion of the above-mentioned solution, leaching the metal from the ore and then precipitating the metal from said portion and using it in the treatment of more ore.

11. The process of treating metalliferous ore which comprises moistening the ore with a relatively concentrated solution containing at least one reagent adapted to react with the ore, and successively subjecting the ore so treated to heating and cooling actions by heating a quantity of said ore through contact with a hot gaseous medium and cooling a so previously heated quantity of said ore by bringing it into contact with a relatively cool gaseous medium thereby partly heating the last-mentioned gaseous medium and converting said now partly heated gaseous medium into the hot gaseous medium aforesaid by reacting upon portions thereof with a reagent adapted to react exothermically therewith, collecting the metallic products and acid fumes from said hot gaseous medium after contact with the ore by condensing the same with a portion of the above-mentioned solution, leaching the metal from the ore with said portion of the solution and washing the leached ore with sufficient water to return to said solution the water lost during the roast, then precipitating the metal from said portion and using it in the treatment of more ore.

12. The method of treating ore and the like which comprises establishing a moving bed of ore and treating the ore in said bed in stages avoiding any relative disturbance of the ore particles forming the bed while passing through said stages, successively subjecting the ore in the bed to contact with gaseous reagents having different temperatures and passing the gaseous reagents surrounding the bed of ore at one stage onto another of said stages by passing said gaseous reagent through the bed of ore while introducing additional reactive material into the last-mentioned medium.

13. The method of treating metalliferous material and the like which comprises moving the mass of material in a steady stream through a determined path without changing the relative position of the ore particles forming the mass constituting the stream, subjecting the material disposed at different portions in said stream to contact with different atmospheres at different temperatures, and converting one of said atmospheres into another by introducing therein a gaseous reagent capable of acting upon the ingredients of said mass to be treated, said reagent being extraneous to said mass.

14. The method of treating ore which comprises moving a bed of ore and the like through heating and cooling stages without any relative disturbance of the ore particles forming the bed, subjecting the ore composing said bed to heating and cooling actions by heating a portion of said bed through the instrumentality of a hot gaseous medium and cooling a so heated portion of the bed by contact with a relatively cool gaseous medium and thereby partly heating the latter and converting the last-mentioned and now partly heated gaseous medium into the hot gaseous medium aforesaid by reacting upon portions thereof with a reagent adapted to react exothermically therewith.

15. The process of treating ore and the like which comprises moving a bed of ore without any relative disturbance of the ore particles forming the bed, heating said ore by passing a hot gaseous medium through a portion of said bed in the initial position thereof and then heating said ore by passing a relatively cool gaseous medium through said portion of the bed in a second position thereof and thereby heating the latter medium and converting the last-mentioned and now partly heated gaseous medium into the hot gaseous medium aforesaid by reacting upon portions thereof with a reagent adapted to react exothermically therewith, said reagent being introduced between such treatments, one of said gaseous mediums being adapted to provide a reducing atmosphere for the ores in one of such treatments.

16. The process of treating ore and the like which comprises moving a bed of ore without any relative disturbance of the ore particles forming the bed, treating said ore by passing a hot gaseous medium through a portion of said bed in the initial position thereof and then heating said ore by passing a relatively cool gaseous medium through said portion of the bed in a second position thereof and thereby heating the latter medium and converting the last-mentioned and now partly heated gaseous medium into the hot gaseous medium aforesaid by reacting upon portions thereof with a reagent adapted to react exothermically therewith, said reagent being introduced between such treatments, one of said gaseous mediums being adapted to provide an oxidizing atmosphere for the ore in one of such treatments.

17. The process of treating ore and the like which comprises moving a bed of ore without any relative disturbance of the ore particles forming the bed, treating said ore by passing a hot gaseous medium through a portion of said bed in the initial position thereof and then heating said ore by passing a relatively cool gaseous medium through said portion of the bed in a second position thereof and thereby heating the latter medium and converting the last-mentioned and now partly heated gaseous medium into the hot gaseous medium aforesaid by reacting upon portions thereof with a reagent adapted to react exothermically therewith, said reagent being introduced between such treatments, one of said gaseous mediums being adapted to provide an oxidizing atmosphere for the ore in one of such treatments and the other of said gaseous mediums being adapted to provide a reducing atmosphere for the ore in the other of such treatments.

18. The process of treating ore and the like which comprises moving a bed of ore without any relative disturbance of the ore particles forming the bed, heating said ore by passing a hot gaseous medium through one portion of the bed in the initial position thereof, and then passing a relatively cool gaseous medium through said portion of the bed in a second position thereof and thereby heating the latter medium, flowing the thus partly heated gaseous medium toward another portion of the bed in its first named position, and further heating said gaseous medium by effecting exothermic reactions in the mass of the gaseous medium during its passage between portions of the bed, thereby forming the hot gaseous medium aforesaid.

19. The process of treating metalliferous ore and the like which comprises moistening the ore with a solution containing at least one reagent adapted to react with the ore and successively subjecting the ore so treated to heating and cooling actions by heating a quantity of said ore by passing a hot gaseous medium through it, and cooling a so heated quantity of said ore by passing a relatively cool gaseous medium through it thereby partly heating the last-mentioned gaseous medium and converting said now partly heated gaseous medium into the hot gaseous medium aforesaid by reacting upon portions thereof with a metallurgical reagent adapted to react exothermically therewith, said reagent being introduced between the heating and cooling stages, collecting the metallic products and acid fumes from said hot gaseous medium after it has passed through the ore by condensing the same with a portion of the above mentioned solution, leaching the metal from the ore with said portion of the solution, then precipitating metal from said portion and using it in the treatment of more ore.

In witness whereof, I subscribe my signature, in the presence of two witnesses.

NIELS C. CHRISTENSEN, Jr.

Witnesses:
JOHN JENSEN,
FRANK E. HOLMAN.